(12) United States Patent
Chang et al.

(10) Patent No.: US 8,759,431 B2
(45) Date of Patent: Jun. 24, 2014

(54) DURABLE POLYOXYMETHYLENE COMPOSITION

(75) Inventors: Jung-Pao Chang, Kaohsiung (TW); Chi-En Lin, Taoyuan County (TW)

(73) Assignee: Min Aik Technology Co., Ltd., Kuei Shan Shiang, Tao Yuan Hsien (TW)

( * ) Notice: Subject to any disclaimer, the term of this patent is extended or adjusted under 35 U.S.C. 154(b) by 92 days.

(21) Appl. No.: 13/484,239

(22) Filed: May 30, 2012

(65) Prior Publication Data

US 2012/0238680 A1    Sep. 20, 2012

Related U.S. Application Data

(63) Continuation-in-part of application No. 12/820,145, filed on Jun. 22, 2010.

(60) Provisional application No. 61/318,784, filed on Mar. 29, 2010.

(51) Int. Cl.
*C08K 5/00* (2006.01)

(52) U.S. Cl.
USPC ........... 524/284; 524/394; 524/432; 524/462; 524/504; 525/64

(58) Field of Classification Search
USPC ............ 524/284, 394, 432, 462, 504; 525/64
See application file for complete search history.

(56) References Cited

U.S. PATENT DOCUMENTS

| | | | |
|---|---|---|---|
| 4,221,700 A | 9/1980 | Minagawa | |
| 4,274,986 A * | 6/1981 | Ikenaga et al. | 528/245.5 |
| 4,647,609 A | 3/1987 | O'Brien | |
| 5,306,772 A * | 4/1994 | Mimura et al. | 525/92 A |
| 5,405,689 A | 4/1995 | Usuki | |
| 5,446,086 A | 8/1995 | Sugiyama | |
| 5,641,824 A | 6/1997 | Forschirm | |
| 6,077,908 A | 6/2000 | Yahiro | |
| 6,147,146 A | 11/2000 | Horio | |
| 6,214,277 B1 | 4/2001 | Saigo | |
| 7,088,555 B2 | 8/2006 | Tsukahara | |
| 7,256,966 B2 | 8/2007 | Horio | |
| 7,355,816 B1 | 4/2008 | Hiller | |
| 7,821,740 B2 | 10/2010 | Horio | |
| 2003/0171470 A1 | 9/2003 | Kurz | |
| 2003/0214757 A1 | 11/2003 | Tokura | |
| 2005/0088782 A1 | 4/2005 | Horio | |
| 2008/0037175 A1 | 2/2008 | Horio | |

FOREIGN PATENT DOCUMENTS

| | | | |
|---|---|---|---|
| CA | 2226388 | | 8/2006 |
| CN | 1421488 A | * | 6/2003 |
| CN | 1608108 A | | 4/2005 |
| CN | 1305959 | | 3/2007 |
| JP | H01126359 A | | 5/1989 |
| JP | H06107901 A | | 4/1994 |
| JP | 2005330463 A | | 12/2005 |
| JP | 200784604 A | | 4/2007 |
| JP | 2009256461 A | | 11/2009 |
| KR | 19940009225 A | | 5/1994 |
| KR | 100227008 B1 | | 10/1999 |
| KR | 100387771 B1 | | 10/2003 |
| KR | 100552023 B1 | | 2/2006 |
| WO | 03055945 A1 | | 7/2003 |

OTHER PUBLICATIONS

Machine translation of CN 1421488 A, 2003.*
Clariant, "Licomont-Specialities for plastics processing," Sep. 2003, coverpage, p. 2-23.

* cited by examiner

*Primary Examiner* — Ling Choi
*Assistant Examiner* — Wenwen Cai
(74) *Attorney, Agent, or Firm* — Winston Hsu; Scott Margo

(57) ABSTRACT

A durable polyoxymethylene composition includes a polyoxymethylene copolymer with 1,3-dioxolane as a comonomer, a lubricant, an inorganic filler, a nucleating agent including a sodium salt, a stabilizer, an anti-static agent. A ramp is made of the durable polyoxymethylene. The ramp and the durable polyoxymethylene have excellent micro-wear-resistant property.

24 Claims, No Drawings

DURABLE POLYOXYMETHYLENE COMPOSITION

CROSS REFERENCE TO RELATED APPLICATIONS

This application is a continuation-in-part application of the application Ser. No. 12/820,145, filed Jun. 22, 2010, which claims the benefit of U.S. Provisional Application No. 61/318,784, filed Mar. 29, 2010.

BACKGROUND OF THE INVENTION

1. Field of the Invention

The present invention generally relates to a durable polyoxymethylene composition and a ramp including a durable polyoxymethylene composition. In particular, the present invention is directed to a durable polyoxymethylene composition as well as a ramp including a durable polyoxymethylene composition with excellent micro-wear-resistant property and extremely small amount of wear debris under a high humidity and high temperature condition, or under a low humidity and low temperature condition.

2. Description of the Prior Art

A polyoxymethylene resin is a widely used engineering resin due to its well-balanced mechanical properties, remarkable chemical resistance and sliding properties as well as the good friction wear performance. Recently, attempts have been made to use such polyoxymethylene resin as material for a ramp in a hard disk drive. When other resins are added to increase the wear-resistant property of the polyoxymethylene resin, lamination or mold deposits often occurs and wear-resistant property accordingly is lowered due to low compatibility. To overcome these problems, it is necessary to clean the molds more frequently so the yield is lower. Addition of inorganic fillers may increase the surface hardness, but excess addition of inorganic fillers or micro-meter size inorganic fillers result in more wear debris that damages the metal parts or contaminates the parts in the hard drive, which in turn jeopardizes the durability. In view of the above, the lubricants and the additives in the polyoxymethylene resin currently have many problems such as compatibility and dispersibility.

For example, US 2008/0037175 discloses a ramp including a polyoxymethylene resin and a colorant for a hard disk drive. The ramp has an outgas level of 20 µg/g or less. U.S. Pat. No. 7,088,555 discloses a ramp having a surface hardness of 2.6 GPa or more.

However, in the aforementioned conventional technologies, no description is yet made to a polyoxymethylene resin with excellent micro-wear-resistant properties, and further, no proposal for attempting to reduce wear debris from a polyoxymethylene resin ramp is found.

SUMMARY OF THE INVENTION

The present invention has the properties of micro-wear resistance, high mechanical stability, high cleanliness and high injection moldability. The function of micro-wear resistance is to decrease the amount of energy necessary for loading/unloading, and also reduces the wear loss and the amount of debris caused when the lift feature of suspension arm rubs against the ramp surface.

The present invention in one aspect provides a durable polyoxymethylene composition. The durable polyoxymethylene composition of the present invention has excellent micro-wear-resistant property to lower the wear debris due to wear loss during the operation. The polyoxymethylene composition of the present invention in one aspect exhibits the micro-wear loss less than 10 µm² wear area, or exhibits the micro-wear loss of 1 µm maximum wear depth under a condition of a load of 2.5 g, reciprocated 600,000 times, at a speed of 8 inch/sec and a low environmental humidity and a low environmental temperature.

The present invention in another aspect provides a durable polyoxymethylene composition. The durable polyoxymethylene composition of the present invention has excellent micro-wear-resistant property. The polyoxymethylene composition of the present invention in another aspect exhibits the micro-wear loss less than 10 µm² wear area or exhibits the micro-wear loss of 1 µm maximum wear depth under a condition of a load of 2.5 g, reciprocated 600,000 times, at a speed of 8 inch/sec and a high environmental humidity and a high environmental temperature.

The present invention in another aspect provides a ramp including a durable polyoxymethylene composition. The ramp of the present invention may exhibit the micro-wear loss less than 10 µm² wear area or exhibit the micro-wear loss of 1 µm maximum wear depth under a condition of a load of 2.5 g, reciprocated 600,000 times, at a speed of 8 inch/sec and a low environmental humidity and a low environmental temperature.

The present invention in another aspect provides a ramp including a durable polyoxymethylene composition. The ramp of the present invention may exhibit the micro-wear loss less than 10 µm² wear area or exhibit the micro-wear loss of 1 µm maximum wear depth under a condition of a load of 2.5 g, reciprocated 600,000 times, at a speed of 8 inch/sec and a high environmental humidity and a high environmental temperature.

In one embodiment of the present invention, the condition of high humidity has a relative humidity in a range from 50% to 60%.

In another embodiment of the present invention, the condition of low humidity has a relative humidity in a range from 13% to 17%.

In one embodiment of the present invention, the condition of high temperature has a temperature in a range from 22° C. to 60° C.

In one embodiment of the present invention, the condition of low temperature has a temperature in a range from 3° C. to 10° C.

The polyoxymethylene composition of the present invention includes:
a polyoxymethylene copolymer of 80 wt % to 95 wt % including 1.0-3.3 wt % of 1,3-dioxolane as a comonomer;
a composite lubricant including a solid lubricant and a liquid lubricant of 1.0 wt % to 10.0 wt %;
a compatilizer of 1.0 wt % to 10.0 wt %;
a nano-scale inorganic filler of 0.1 wt % to 3.0 wt %;
a nucleating agent of 0.1 wt % to 3.0 wt %;
a stabilizer of 0.5 wt % to 1.0 wt %; and
an anti-static agent of 0.5 wt % to 5.0 wt %.

In the polyoxymethylene composition of the present invention, the polyoxymethylene copolymer may have a tensile strength 60-65 Mpa (ISO 527) tensile strength and melt flow rate 20-35 g/10 min (ISO 1133).

In the polyoxymethylene composition of the present invention, the composite lubricant may include various lubricants. For example, lubricants may be (A) a solid lubricant including the combination of one or more solid lubricant components and (B) a liquid lubricant including the combination of one or more liquid lubricant components. The composite lubricant may exhibit a synergistic effect of wear resistance, anti-scratch, low friction, high sliding, etc.

In the composite lubricant of the present invention, A) the solid lubricant is 70 wt % to 90 wt % of the total weight of the composite lubricant and (B) the liquid lubricant is 10 wt % to 30 wt % of the total weight of the composite lubricant.

In the composite lubricant of the present invention, the solid lubricant may be a polyamide resin or polyvinylidene difluoride (PVDF). The polyamide resin may be nylon-11 or nylon-12.

In the composite lubricant of the present invention, the liquid lubricant may be perfluoropolyether (PFPE), which mainly serves to improve processability, to lower the coefficient of friction and to reduce the wear loss due to sliding abrasion.

In the polyoxymethylene composition of the present invention, the compatilizer may be a maleic anhydride grafted styrene/low density ethylene copolymer, or an epoxy-containing styrene/acrylic copolymer, which mainly serves to reduce the interface energy of the polymers to increase the compatibility between the polyoxymethylene composition and the solid lubricant so that the solid lubricant can be uniformly dispersed in the polyoxymethylene composition to improve mechanical properties and wear-resistant properties.

In the polyoxymethylene composition of the present invention, the inorganic filler may be nano-grade zinc oxide particles with an average particle size of 100 nm or less, or other nano-grade inorganic fillers. The nano-grade inorganic filler can increase the surface hardness of polyoxymethylene to improve the wear-resistant property and dimensional stability.

In the polyoxymethylene composition of the present invention, the nucleating agent may be at least one of a sodium salt or a calcium salt of montanic acid and of a long chain, linear carboxylic acid to enhance the crystallinity of polyoxymethylene and to increase the mechanic properties. For example, the nucleating agent may be Licomont Cav 102 or Licomont Nav 101 from Clariant.

In the polyoxymethylene composition of the present invention, the stabilizer may be a mixture of IRGANOX 1010, IRGANOX 259 and IRGANOX 1098 from CIBA, MELAMINE, calcium stearate and PALMOWAX (specification EBS-SP).

In the polyoxymethylene composition of the present invention, the anti-static agent may be a glycerol monostearate or a polyether polyamide block polymer.

The polyoxymethylene composition of the present invention may further include an ultra high molecular weight polyethylene of molecular weight 2 million with average particle size 30 μm in a range of 3 wt % to 10 wt %.

The polyoxymethylene composition of the present invention may further include a low density polyethylene of 5 wt %.

The polyoxymethylene composition of the present invention may be in a form of pellets of 2mm by 3mm dimension.

The polyoxymethylene composition of the present invention may be in a form of a hollow column.

These and other objectives of the present invention will no doubt become obvious to those of ordinary skill in the art after reading the following detailed description of the preferred embodiment that is illustrated in the various figures and drawings.

DETAILED DESCRIPTION

The present invention generally relates to a durable polyoxymethylene composition as well as a load/unload ramp structure. Load/unload ramp structure is use to keep a magnetic head away from the rotating disk. A suspension arm holds a magnetic head for reading and writing of information from and to an information recording disk rotating at a high speed in a hard disk drive. In a recent hard disk drive, there is provided a ramp as a magnetic-head retraction location where the head is held as spaced from a recording disk when the disk is in its inoperable mode.

The present invention in a first aspect provides a durable polyoxymethylene composition. The durable polyoxymethylene composition of the present invention has excellent micro-wear-resistant property. The polyoxymethylene composition of the present invention in one aspect exhibits the micro-wear loss less than 10 $\mu m^2$ wear area or 1 μm maximum wear depth under a condition of a load of 2.5 g, reciprocated 600,000 times, at a speed of 8 inch/sec and a low environmental humidity and a low environmental temperature, or generates extreme low wear debris.

In another embodiment of the present invention, the condition of low humidity has a relative humidity in a range from 13% to 17%. In another embodiment of the present invention, the condition of low temperature has a temperature in a range from 3° C. to 10° C. In one preferred embodiment of the present invention, the polyoxymethylene composition forms a ramp for use in a hard drive.

The present invention in another aspect provides another durable polyoxymethylene composition. The durable polyoxymethylene composition of the present invention also has excellent micro-wear-resistant property. The polyoxymethylene composition of the present invention in another aspect exhibits the micro-wear loss less than 10 $\mu m^2$ wear area or 1 μm maximum wear depth under a condition of a load of 2.5 g, reciprocated 600,000 times, at a speed of 8 inch/sec and a high environmental humidity and a high environmental temperature, or generates extreme low wear debris.

In one embodiment of the present invention, the condition of high humidity has a relative humidity in a range from 50% to 60%. In another embodiment of the present invention, the condition of high temperature has a temperature in a range from 22° C. to 60° C. In one preferred embodiment of the present invention, the polyoxymethylene composition forms a ramp for use in a hard drive.

The polyoxymethylene composition of the present invention includes some components, such as a polyoxymethylene copolymer, an inorganic filler, a composite lubricant, a compatilizer, a nucleating agent, a stabilizer, and an anti-static agent. The polyoxymethylene composition includes the polyoxymethylene copolymer of 80 wt % to 95 wt % including 1.0-3.3 wt % of 1,3-dioxolane as a comonomer. For example, the polyoxymethylene copolymer may have a tensile strength 60-65 Mpa (ISO 527) and melt flow rate 20-35 g/10min (ISO 1133).

The polyoxymethylene composition may include a composite lubricant of 1.0 wt % to 10.0 wt %. For example, the lubricant may be a solid lubricant such as a polyamide resin, for example nylon-11 or nylon-12, or polyvinylidene difluoride (PVDF). The liquid lubricant may be perfluoropolyether (PFPE). The polyoxymethylene composition of the present invention may further include a low density polyethylene with a melt flow rate 22 g/10 min. In addition, the polyoxymethylene composition of the present invention may further include an ultra high molecular weight polyethylene of molecular weight 2 million with average particle size 30 μm in a range of 3 wt % to 10 wt %.

The polyoxymethylene composition of the present invention may include a compatilizer of 1.0 wt % to 10 wt %, such as a maleic anhydride grafted styrene/low density ethylene copolymer, or an epoxy-containing styrene/acrylic copolymer.

There may be various and different inorganic fillers. For example, one suitable inorganic filler may be nano-grade zinc oxide particles of 0.1 wt % to 3.0 wt % with an average particle size of 100 nm or less or other nano-grade inorganic fillers.

The polyoxymethylene composition includes the nucleating agent of 0.1 wt % to 3.0 wt %. For example, the nucleating agent may be at least one of a sodium salt or a calcium salt of montanic acid and one of a sodium salt or a calcium salt of a long chain, linear carboxylic acid. For example, the nucleating agent may be Licomont Cav 102, Licomont Nav 101 or the combination thereof from Clariant.

The polyoxymethylene composition includes the stabilizer of 0.5 wt % to 1.0 wt %, such as at least one of an antioxidant and an acid scavenger. For example, the stabilizer may be a mixture of IRGANOX 1010, IRGANOX 259 and IRGANOX 1098 from CIBA, MELAMINE, calcium stearate and PALMOWAX (specification EBS-SP).

The polyoxymethylene composition includes the anti-static agent of 0.5 wt % to 5.0 wt %. For example, the anti-static agent may be a glycerol monostearate.

In addition to being processed to form a ramp, the polyoxymethylene composition of the present invention may also be processed to form pellets. For example, the pellets may be hollow columns of 2 mm by 3 mm dimension. The pellets are advantageous for use in transportation or in storage. The pellets may be later processed to form ramps when needed.

Some examples are given here to demonstrate the steps to formulate and to form the micro-wear-resistant and few-amount-of-wear-debris polyoxymethylene composition of the present invention.

EXAMPLE 1

Materials (A) polyoxymethylene copolymer (88.7 wt. %); (B) a lubricant of LDPE of 5.0 wt. %; (B-4) perfluoropolyether (1.0 wt. %) and (C) a compatibilizer (3.0 wt. %); (D) an inorganic filler of nano-grade zinc oxide (0.5 wt. %); (E) a nucleating agent Licomont Cav 102 from Clariant (0.3 wt %) and (F) a stabilizer IRGANOX 1010, IRGANOX 259 and IRGANOX 1098 from CIBA, MELAMINE, calcium stearate and PALMOWAX (0.5 wt %) and (G) an anti-static agent (1 wt. %) were well mixed in a high speed vertical mixer for 2 min. The mixed materials (5 KG) were placed in a raw material tank after mixing.

The mixed materials were fed into a twin screw extruders (φ=44 mm) by a feeder. The feeding was set to be 35 kg/hr. The extruder barrel was adjusted to 160-220° C. The vacuum was adjusted to 10-30 cm Hg. The melted composition were cooled and cut to be pellets in the form of 3 mm*2 mm, then dried by a hot blow dryer at 130° C. for 4 hours. The pellets were injected to form ramps of 0.17 g, 11.6×6.2×5.2 mm each piece and the results are tested and shown in TABLE 1. The ramps were washed in an ultrasonic cleaner (first stage in a 1% surfactant VALTRON® DP97031, second to fifth stages in deionized water, 8 min in each stage). The wet ramps were dried in a cyclone type oven at 85° C. for 8 min., then dried in a dry oven at 85° C. for 1 hour. The ramps were subject to various tests. The results were listed in TABLE 2.

EXAMPLE 2

Methods, materials and ratios which are similar to those of Example 1 were used except that (B-1) a solid lubricant of polyvinylidene difluoride (5.0 wt. %). The results are tested and shown in TABLE 1 and the ramps were subject to various tests. The results were also listed in TABLE 2.

EXAMPLE 3

Methods, materials and ratios which are similar to those of Example 1 were used except that (B-2) a lubricant of UHMWPE (molecular weight 2 million(ASTM D4020) with average particle size 30 μm) (5.0 wt. %). The results are tested and shown in TABLE 1 and the ramps were subject to various tests. The results were also listed in TABLE 2.

EXAMPLE 4

Methods which are similar to those of Example 1 were used except that (A) polyoxymethylene copolymer (89.2 wt. %) ; (B-3) nylon-12 (5.0 wt. %); (B-4) perfluoropolyether (1.0 wt. %); (C) a compatibilizer (3.0 wt. %); (D) an inorganic filler of nano-grade zinc oxide (0.0 wt. %); (E) a nucleating agent Licomont Cav 102 from Clariant (0.3 wt %) and (F) a stabilizer IRGANOX 1010, IRGANOX 259 and IRGANOX 1098 from CIBA, MELAMINE, calcium stearate and PALMOWAX (0.5 wt %) with (G) an anti-static agent of 1.0 wt %. The results are tested and shown in TABLE 1. The ramps were subject to various tests. The results were also listed in TABLE 2.

EXAMPLE 5

Methods which are similar to those of Example 1 were used except that (A) polyoxymethylene copolymer (91.7 wt. %); (B-3) nylon-12 (5.0 wt. %); (B-4) perfluoropolyether (1.0 wt. %); (C) a compatibilizer (0.0 wt. %); (D) an inorganic filler of nano-grade zinc oxide (0.5 wt. %); (E) a nucleating agent Licomont Cav 102 from Clariant (0.3 wt %) and (F) a stabilizer IRGANOX 1010, IRGANOX 259 and IRGANOX 1098 from CIBA, MELAMINE, calcium stearate and PALMOWAX (0.5 wt %) with (G) an anti-static agent of 1.0 wt %. The results are tested and shown in TABLE 1. The ramps were subject to various tests. The results were also listed in TABLE 2.

EXAMPLE 6

Methods which are similar to those of Example 1 were used except that (A) polyoxymethylene copolymer (89.7 wt. %); (B-3) nylon-12 (5.0 wt. %); (B-4) perfluoropolyether (0.0 wt. %); (C) a compatibilizer (3.0 wt. %); (D) an inorganic filler of nano-grade zinc oxide (0.5 wt. %); (E) a nucleating agent Licomont Cav 102 from Clariant (0.3 wt %) and (F) a stabilizer IRGANOX 1010, IRGANOX 259 and IRGANOX 1098 from CIBA, MELAMINE, calcium stearate and PALMOWAX (0.5 wt %) with (G) an anti-static agent of 1.0 wt %. The results are tested and shown in TABLE 1. The ramps were subject to various tests. The results were also listed in TABLE 2.

EXAMPLE 7

Methods which are similar to those of Example 1 were used except that (A) polyoxymethylene copolymer (88.7 wt. %); (B-3) nylon-12 (5.0 wt. %); (B-4) perfluoropolyether (1.0 wt. %); (C) a compatibilizer (3.0 wt. %); (D) an inorganic filler of nano-grade zinc oxide (0.5wt. %); (E) a nucleating agent Licomont Cav 102 from Clariant (0.3 wt %) and (F) a stabilizer IRGANOX 1010, IRGANOX 259 and IRGANOX 1098 from CIBA, MELAMINE, calcium stearate and PALMO- WAX (0.5 wt %) with (G) an anti-static agent of 1.0 wt %. The results are tested and shown in TABLE 1. The ramps were subject to various tests. The results were also listed in TABLE 2.

COMPARATIVE EXAMPLE 1

A raw material, polyoxymethylene resin pellets (Polyplastics-Duracon M9044) were dried at 100° C. for 4 hrs. The pellets were injected to form ramps of 0.41 g, 13.5×8.8×8.6 mm each piece. The ramps were washed in an ultrasonic cleaner (first stage in a 1% surfactant VALTRON® DP97031, second to fifth stages in deionized water, 8 min in each stage). The wet ramps were dried in a cyclone type oven at 85° C. for 8 min., then dried in a dry oven at 85° C. for 1 hour. The ramps were subject to various tests. The results were listed in TABLE 3.

COMPARATIVE EXAMPLE 2

A raw material, polyoxymethylene resin pellets (DuPont-Derlin 500P) were dried at 100° C. for 4 hrs. The pellets were injected to form ramps of 0.17 g, 11.6×6.2×5.2 mm each piece. The ramps were washed in an ultrasonic cleaner (first stage in a 1% surfactant VALTRON® DP97031, second to fifth stages in deionized water, 8 min in each stage). The wet ramps were dried in a cyclone type oven at 85° C. for 8 min., then dried in a dry oven at 85° C. for 1 hour. The ramps were subject to various tests. The results were listed in TABLE 3.

TABLE 1

| | EXAMPLE 1-EXAMPLE 3 | | 1 | 2 | 3 |
|---|---|---|---|---|---|
| Ingredients | A: polyoxymethylene or polyoxymethylene copolymer | | 88.7 | 88.7 | 88.7 |
| | B: solid lubricant | low density ethylene | 5 | — | — |
| | B-1 | PVDF | — | 5 | — |
| | B-2 | ultra high molecular weight ethylene | — | — | 5 |
| | B-3 | nylon-12 | | | |
| | B-4: liquid lubricant | Perfluoropoly-ether | 1 | 1 | 1 |
| | C: compatibilizer | Remark C (see above) | 3 | 3 | 3 |
| | D: inorganic filler | nano-grade zinc oxide | 0.5 | 0.5 | 0.5 |
| | E: nucleating agent | Licomont Cav 102 | 0.3 | 0.3 | 0.3 |
| | F: stabilizer | Remark F (see above) | 0.5 | 0.5 | 0.5 |
| | G: anti-static agent | glycerol monostearate | 1 | 1 | 1 |
| Results | Physical properties | melt flow rate (ISO 1133) | 27 | 26 | 25 |
| | properties | Tensile strength (ISO 527-1, 2) | 60 | 61 | 59 |
| | | Flexural strength (ISO 178) | 88 | 84 | 83 |
| | | Charpy Impact (ISO 179/1eA) | 6 | 6 | 7 |

| | EXAMPLE 4-EXAMPLE 7 | | 4 | 5 | 6 | 7 |
|---|---|---|---|---|---|---|
| Ingredients | A: polyoxymethylene or polyoxymethylene copolymer | | 89.2 | 91.7 | 89.7 | 88.7 |
| | B: solid lubricant | low density ethylene | | | | — |
| | B-1 | PVDF | | | | |
| | B-2 | ultra high molecular weight ethylene | | | | — |
| | B-3 | nylon-12 | 5 | 5 | 5 | 5 |
| | B-4: liquid lubricant | Perfluoropoly-ether | 1 | 1 | 0 | 1 |
| | C: compatibilizer | Remark C (see above) | 3 | 0 | 3 | 3 |
| | D: inorganic filler | nano-grade zinc oxide | 0 | 0.5 | 0.5 | 0.5 |
| | E: nucleating agent | Licomont Cav 102 | 0.3 | 0.3 | 0.3 | 0.3 |
| | F: stabilizer | Remark F (see above) | 0.5 | 0.5 | 0.5 | 0.5 |
| | G: anti-static agent | glycerol monostearate | 1 | 1 | 1 | 1 |
| Results | Physical properties | melt flow rate (ISO 1133) | 28 | 29 | 27 | 28 |

TABLE 1-continued

| properties | Tensile strength (ISO 527-1, 2) | 57 | 58 | 58 | 59 |
|---|---|---|---|---|---|
| | Flexural strength (ISO 178) | 78 | 80 | 79 | 85 |
| | Charpy Impact (ISO 179/1eA) | 9 | 6 | 9 | 9 |

Remarks:
A: polyoxymethylene or polyoxymethylene copolymer of melt flow rate 30 g/10 min (ISO 1133)
B: solid lubricant, low density ethylene, PAXOTHENE NA208;
B-1: solid lubricant, polyvinylidene difluoride (PVDF), Kureha PVFD 850;
B-2: solid lubricant, ultra high molecular weight ethylene, MIPELON XM-220;
B-3: solid lubricant, nylon-12, m.p. 178° C.;
B-4: liquid lubricant, perfluoropolyether (PFPE);
C: compatilizer, maleic anhydride grafted styrene/low density ethylene copolymer;
D: inorganic filler, nano-grade zinc oxide, average particle size 100 nm;
E: nucleating agent, Licomont Cav102, calcium salt of the montanic acids;
F: stabilizer, mixture of IRGANOX 1010, IRGANOX 259 and IRGANOX 1098 from CIBA, MELAMINE, calcium stearate and PALMOWAX (EBS-SP standard);
G: anti-static agent, glycerol monostearate.

The following test results are carried out under a condition of after being reciprocated 600,000 times:

(1) at a load of 2.5 g;
(2) at a speed of 8 inch/sec;
(3) under an environmental low humidity or high humidity; and
(4) under an environmental low temperature, room temperature or high temperature.

Example 1 demonstrates a primary evaluation of the polyoxymethylene composition of the present invention. Example 2-4 are further modified and improved in accordance with Example 1. Example 5 demonstrates excellent micro-wear-resistant properties in comparison to the comparative examples. Example 5 exhibits excellent micro-wear-resistant properties in both (A) low humidity/low temperature condition, (B) high humidity/high temperature condition and (C) room temperature. Example 5 also generates least wear debris to show excellent micro-wear-resistant properties in (A) low humidity/low temperature condition, (B) high humidity/high temperature condition and (C) room temperature.

TABLE 2

| | Example 1 | Example 2 | Example 3 | Example 4 | Example 5 | Example 6 |
|---|---|---|---|---|---|---|
| Condition | (A) 5° C. ± 2° C. 15% ± 3% RH | (A) 5° C. ± 2° C. 15% ± 3% RH | (A) 5° C. ± 2° C. 15% ± 3% RH | (A) 5° C. ± 2° C. 15% ± 3% RH | (A) 5° C. ± 2° C. 15% ± 3% RH | (A) 5° C. ± 2° C. 15% ± 3% RH |
| Maximum wear depth | 0.3890 | 0.3301 | 0.2474 | 0.2292 | 1.0500 | 0.5261 |
| | 0.4466 | 0.3279 | 0.3446 | 0.2844 | 1.1800 | 0.6344 |
| | 0.9180 | 0.4028 | 0.1547 | 0.5014 | 0.7733 | 0.3698 |
| | 0.3702 | 0.3473 | 0.0785 | 0.2244 | 1.0455 | 0.8624 |
| Wear Area | 4.4868 | 9.2383 | 1.7316 | 1.4760 | 24.8500 | 12.0457 |
| | 3.9027 | 7.1192 | 8.2014 | 1.5837 | 29.6900 | 12.4023 |
| | 5.7947 | 5.2397 | 1.1880 | 6.4781 | 15.3849 | 9.0576 |
| | 6.3641 | 7.4159 | 0.8134 | 9.6901 | 24.8515 | 12.0457 |

| | Example 7 | | | |
|---|---|---|---|---|
| Condition | (A) 5° C. ± 2° C. 15% ± 3% RH | (A) 10° C. ± 2° C. 15% ± 3% RH | (C) 25° C. ± 3° C. 55% ± 5% RH | (B) 55° C. ± 5° C. 55% ± 5% RH |
| Maximum wear depth | 0.0888 | 0.1740 | 0.0573 | 0.0735 |
| | 0.0915 | 0.2216 | 0.2277 | 0.1274 |
| | 0.1752 | 0.2181 | 0.0820 | 0.2216 |
| | 0.2100 | 0.1137 | 0.1091 | 0.2291 |
| Wear Area | 1.5791 | 3.9492 | 0.4437 | 0.8667 |
| | 1.4484 | 3.4538 | 1.8543 | 1.7613 |
| | 2.0638 | 2.5785 | 1.6032 | 1.8775 |
| | 3.2159 | 2.2625 | 0.4718 | 2.0090 |

Remarks:
1. (A) low humidity/low temperature; (B) high humidity/high temperature; (C) room temperature.
2. The data was measured by Wyko (MHT-III)machine(Different brands machine might have different test results).
3. The parts were tested by CETR Micro-Tribometer UMT (Load/Unload model) with suspension component.

TABLE 3

Comparative Example 1

| Condition | (A) 5° C. ± 2° C. 15% ± 3% RH | (C) 25° C. ± 3° C. 55% ± 5% RH | (B) 55° C. ± 5° C. 55% ± 5% RH |
|---|---|---|---|
| Maximum wear depth | 1.8854 | 0.3795 | 0.2768 |
|  | 2.2465 | 0.3597 | 0.4282 |
|  | 1.8726 | 0.2569 | 0.4215 |
|  | 1.8947 | 0.4435 | 0.6491 |
| Wear Area | 181.2939 | 13.1565 | 4.7282 |
|  | 172.5484 | 9.1015 | 17.1287 |
|  | 161.4402 | 7.2146 | 7.8671 |
|  | 180.5232 | 8.5611 | 19.7332 |

Comparative Example 2

| Condition | (A) 5° C. ± 2° C. 15% ± 3% RH | (A) 10° C. ± 2° C. 15% ± 3% RH | (C) 25° C. ± 3° C. 55% ± 5% RH | (B) 55° C. ± 5° C. 55% ± 5% RH |
|---|---|---|---|---|
| Maximum wear depth | 2.5730 | 2.5730 | 0.7733 | 0.3698 |
|  | 2.0564 | 1.6634 | 1.0455 | 0.5261 |
|  | 1.8703 | 2.1453 | 1.5200 | 0.6344 |
|  | 2.1701 | 1.4446 | 1.1794 | 0.8624 |
| Wear Area | 99.8968 | 99.8968 | 15.3849 | 9.0576 |
|  | 76.3102 | 98.7693 | 24.8515 | 12.0457 |
|  | 60.1881 | 85.8774 | 42.3004 | 12.4023 |
|  | 85.8774 | 86.7332 | 29.6912 | 14.6838 |

Remarks:
1. (A) low humidity/low temperature; (B) high humidity/high temperature; (C) room temperature.
2. The data was measured by Wyko (MHT-III)machine(Different brands machine might have different test results).
3. The parts were tested by CETR Micro-Tribometer UMT (Load/Unload model) with suspension component.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A polyoxymethylene composition, which has at least one of the micro-wear loss of less than 1 μm maximum wear depth and less than 10 μm² wear area under a condition of a load of 2.5 g after being reciprocated 600,000 times at a speed of 8 inch/second and an environmental humidity of 13% to 17%RH and an environmental temperature of 3° C. to 10° C., the polyoxymethylene composition comprising:
 a polyoxymethylene copolymer of 80 wt % to 95 wt %;
 a composite lubricant of 1.0 wt % to 10.0 wt %, which comprises a solid lubricant and a liquid lubricant;
 a compatibilizer of 1.0 wt % to 10.0 wt %, wherein the compatibilizer comprises a maleic anhydride grafted styrene/low density ethylene copolymer;
 a nano-scale inorganic filler of 0.1 wt % to 3.0 wt %;
 a nucleating agent of 0.1 wt % to 3.0 wt %;
 a stabilizer of 0.5 wt % to 1.0 wt %; and
 an anti-static agent of 0.5 wt % to 5.0 wt %.

2. The polyoxymethylene composition of claim 1, wherein the solid lubricant comprises a polyamide resin and the liquid lubricant comprises perfluoropolyether.

3. The polyoxymethylene composition of claim 2, wherein the polyamide resin comprises at least one of nylon-11 and nylon-12.

4. The polyoxymethylene composition of claim 1, wherein the solid lubricant is 70 wt % to 90 wt % of the total weight of the composite lubricant and the liquid lubricant is 10 wt % to 30 wt % of the total weight of the composite lubricant.

5. The polyoxymethylene composition of claim 1, wherein said inorganic filler comprises at least one of nano-grade zinc oxide particles with an average particle size not greater than 100 nm and another nano-grade inorganic filler with a particle size not greater than 100 nm.

6. The polyoxymethylene composition of claim 1, wherein the nucleating agent comprises at least one of a sodium salt and a calcium salt of montanic acid and of a long chain, linear carboxylic acid.

7. The polyoxymethylene composition of claim 1, wherein the stabilizer comprises at least one of an antioxidant and an acid scavenger.

8. The polyoxymethylene composition of claim 1, wherein the anti-static agent comprises a glycerol monostearate.

9. The polyoxymethylene composition of claim 1, wherein the solid lubricant comprises low density ethylene.

10. The polyoxymethylene composition of claim 1, wherein the solid lubricant comprises polyvinylidene difluoride (PVDF).

11. The polyoxymethylene composition of claim 1, wherein the solid lubricant further comprising an ultra high molecular weight polyethylene having a molecular weight of 2 million with an average particle size of 30 μm in a range of 3 wt % to 10 wt %.

12. A ramp which has at least one of the micro-wear loss of less than 1 μm maximum wear depth and of less than 10 μm² wear area under a condition of a load of 2.5 g after being reciprocated 600,000 times at a speed of 8 inch/sec and an environmental humidity of 13% to 17%RH and an environmental temperature of 3° C. to 10° C., the ramp comprising:
 a polyoxymethylene copolymer of 80 wt % to 95 wt %;
 a composite lubricant of 1.0 wt % to 10.0 wt %, which comprises a solid lubricant and a liquid lubricant;
 a compatibilizer of 1.0 wt % to 10.0 wt %, wherein the compatibilizer comprises a maleic anhydride grafted styrene/low density ethylene copolymer;
 a nano-scale inorganic filler of 0.1 wt % to 3.0 wt %;
 a nucleating agent of 0.1 wt % to 3.0 wt %;
 a stabilizer of 0.5 wt % to 1.0 wt %; and
 an anti-static agent of 0.5 wt % to 5.0 wt %.

13. A micro-wear-resistant polyoxymethylene composition which has at least one of the micro-wear loss of less than 0.5 μm maximum wear depth and of less than 5 μm² wear area under a condition of a load of 2.5 g after being reciprocated 600,000 times at a speed of 8 inch/sec and an environmental humidity of 50% to 60%RH and an environmental temperature of 22 ° C. to 60 ° C., the micro-wear-resistant polyoxymethylene composition comprising:
 a polyoxymethylene copolymer of 80 wt % to 95 wt %;
 a composite lubricant of 1.0 wt % to 10.0 wt %, which comprises a solid lubricant and a liquid lubricant;
 a compatibilizer of 1.0 wt % to 10.0 wt %, wherein the compatibilizer comprises a maleic anhydride grafted styrene/low density ethylene copolymer;
 a nano-scale inorganic filler of 0.1 wt % to 3.0 wt %;
 a nucleating agent of 0.1 wt % to 3.0 wt %;
 a stabilizer of 0.5 wt % to 1.0 wt %; and
 an anti-static agent of 0.5 wt % to 5.0 wt %.

14. The polyoxymethylene composition of claim 13, wherein the solid lubricant comprises a polyamide resin and the liquid lubricant comprises perfluoropolyether.

15. The polyoxymethylene composition of claim 14, wherein the polyamide resin comprises at least one of nylon-11 and nylon-12.

16. The polyoxymethylene composition of claim 13, wherein the solid lubricant is 70 wt % to 90 wt % of the total weight of the composite lubricant and the liquid lubricant is 10 wt % to 30 wt % of the total weight of the composite lubricant.

17. The polyoxymethylene composition of claim 13, wherein said inorganic filler comprises at least one of nano-grade zinc oxide particles with an average particle size not greater than 100 nm and another nano-grade inorganic filler with a particle size not greater than 100 nm.

18. The polyoxymethylene composition of claim 13, wherein the nucleating agent comprises at least one of a sodium salt and a calcium salt of montanic acid and of a long chain, linear carboxylic acid.

19. The polyoxymethylene composition of claim 13, wherein the stabilizer comprises at least one of an antioxidant and an acid scavenger.

20. The polyoxymethylene composition of claim 13, wherein the anti-static agent comprises a glycerol monostearate.

21. The polyoxymethylene composition of claim 13, wherein the solid lubricant comprises low density ethylene.

22. The polyoxymethylene composition of claim 13, wherein the solid lubricant comprises polyvinylidene difluoride (PVDF).

23. The polyoxymethylene composition of claim 13, further comprising:
an ultra high molecular weight polyethylene of molecular weight 2 million with average particle size 30 μm in a range of 3 wt % to 10 wt %.

24. A ramp which has at least one of the micro-wear loss of less than 0.5 μm maximum wear depth and of less than 5 μm² wear area under a condition of a load of 2.5 g after being reciprocated 600,000 times at a speed of 8 inch/sec and an environmental humidity of 50%-60%RH and an environmental temperature of 22° C. to 60° C., the ramp comprising:
a polyoxymethylene copolymer of 80 wt % to 95 wt %;
a composite lubricant of 1.0 wt % to 10.0 wt %, which comprises a solid lubricant and a liquid lubricant;
a compatibilizer of 1.0 wt % to 10.0 wt %, wherein the compatibilizer comprises a maleic anhydride grafted styrene/low density ethylene copolymer;
a nano-scale inorganic filler of 0.1 wt % to 3.0 wt %;
a nucleating agent of 0.1 wt % to 3.0 wt %;
a stabilizer of 0.5 wt % to 1.0 wt %; and
an anti-static agent of 0.5 wt % to 5.0 wt %.

* * * * *